US008490854B2

(12) United States Patent
Takayama

(10) Patent No.: US 8,490,854 B2

(45) Date of Patent: Jul. 23, 2013

(54) WIRE END PROCESSING METHOD

(75) Inventor: Tsutomu Takayama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/502,435

(22) PCT Filed: Jan. 18, 2011

(86) PCT No.: PCT/JP2011/051158
§ 371 (c)(1),
(2), (4) Date: Apr. 17, 2012

(87) PCT Pub. No.: WO2011/087157
PCT Pub. Date: Jul. 21, 2011

(65) Prior Publication Data

US 2012/0205423 A1 Aug. 16, 2012

(30) Foreign Application Priority Data

Jan. 18, 2010 (JP) ................................ 2010-008045

(51) Int. Cl.
*B23K 20/10* (2006.01)

(52) U.S. Cl.
USPC ........................... 228/111; 228/110.1; 29/871

(58) Field of Classification Search
USPC ................................. 228/111, 110.1; 29/871
See application file for complete search history.

(56) References Cited

U.S. PATENT DOCUMENTS

| | | | |
|---|---|---|---|
| 2004/0088857 A1 | 5/2004 | Fujimoto et al. | |
| 2006/0283912 A1 | 12/2006 | Eberach | |

FOREIGN PATENT DOCUMENTS

| | | |
|---|---|---|
| DE | 10340284 A1 | 3/2004 |
| GB | 910249 | 11/1962 |
| JP | 05159628 A | 6/1993 |
| WO | 2005042202 A1 | 5/2005 |

OTHER PUBLICATIONS

International Search Report dated Apr. 29, 2011 issued in International Patent Application No. PCT/JP2011/051158 (PCT/ISA/210).
Written Opinion dated Apr. 29, 2011 issued in International Patent Application No. PCT/JP2011/051158 (PCT/ISA/237).

*Primary Examiner* — Nicholas P D'Aniello
(74) *Attorney, Agent, or Firm* — Sughrue Mion, PLLC

(57) ABSTRACT

A wire end processing method includes tree steps. In a core wire portion exposing step, a sheath of a wire is stripped so as to expose a core wire portion composed of a plurality of element wires. In a core wire portion unifying step, ultrasonic vibration is applied to the exposed core wire portion while applying a pressure thereto, thereby causing the plurality of the element wires to rub against one another so as to unify the core wire portion. In a terminal connecting step, the unified core wire portion is press-contacted or press-fitted to the terminal.

3 Claims, 6 Drawing Sheets

WIRE END PROCESSING METHOD

TECHNICAL FIELD

This invention relates to a method of processing an end of a wire by press-contacting or press-fitting.

BACKGROUND ART

As a method of electrically connecting a wire and a terminal together, there is known one in which the wire is pressed to be inserted between a pair of press-contacting blades so as to contact the press-contacting blades with a core wire portion of the wire, thereby effecting the connection. In the method of effecting the connection by press-contacting, the wire is pressed to be inserted between the pair of press-contacting blades without removing a sheath of the wire. PTL 1 mentioned below discloses one example of methods of effecting the connection by press-contacting.

CITATION LIST

Patent Literature

[PTL 1] JP-A-05-159628

SUMMARY OF INVENTION

Technical Problem

In the electrical connection between a wire and a terminal, in a case in which a plurality of element wires forming a core wire portion of the wire are thin, several problems mentioned in the following are encountered with the method of effecting the connection by press-contacting. In FIG. 6A, there are provided a pair of press-contacting blades 1, and when a slot width W1 which is a gap between these blades is narrow, a part of the plurality of element wires 3 forming the core wire portion 2, which is surrounded by dashed line, are cut. On the other hand, when the slot width W2 is wider as shown in FIG. 6B, an area of contact between each press-contacting blade 1 and the element wires 3, in a contact region surrounded by dashed line, are extremely small although the element wires 3 are not cut, and as a result this causes the increase of a resistance value. Further, as shown in FIG. 6C, when the wire is pressed to be inserted between the press-contacting blades in an offset manner or when there is a variation in the cross-sectional shape of the core wire portion 2, a number of those element wires 3 contacting the press-contacting blades 1 in a contact region surrounded by dashed line is reduced, so that this also causes the increase of the resistance value as described above.

This invention has been made in view of the above circumstances, and an object of the invention is to provide a wire end processing method in which the good connection can be effected, and also variations relating to the connection can be absorbed.

Solution to Problem

According to one aspect of the present invention, there is provided a wire end processing method, comprising:

a core wire portion exposing step of stripping a sheath of a wire so as to expose a core wire portion composed of a plurality of element wires;

a core wire portion unifying step of applying ultrasonic vibration to the exposed core wire portion while applying a pressure thereto, thereby causing the plurality of the element wires to rub against one another so as to unify the core wire portion, so that the core wire portion is formed into a cross-sectional shape corresponding to a shape of a portion of a terminal where the core wire portion is to be press-contacted or press-fitted; and a terminal connecting step of press-contacting or press-fitting the unified core wire portion to the terminal.

According to another aspect of the present invention, there is provided an ultrasonic processing apparatus, comprising:

a welding horn on which ultrasonic vibration is applied to a core wire portion of a wire;

an anvil disposed in opposed to the welding horn so as to receive the core wire portion;

a horn-side plate mounted on the welding horn so as to move thereon; and an anvil-side plate mounted on the anvil in opposed to the horn-side plate and configured to move in a directions toward and away from the horn-side plate, wherein the horn-side plate and the anvil-side plate are configured to form the core wire portion into a predetermined shape.

Advantageous Effects of Invention

According to the aspect of the present invention, the plurality of element wires forming the core wire portion are caused to rub against one another by the ultrasonic vibration, and the element wires are melted together by frictional heat generated by this rubbing, and because of this melting, the plurality of element wires are changed into a solid wire just as in a united condition. Namely, the plurality of small-diameter element wires are changed into the single core wire portion of a larger diameter. The pressure is also applied to the core wire portion at the time of applying the ultrasonic vibration thereto, so that the core wire portion is stabilized in shape. Since the core wire portion is stabilized in shape, the core wire portion is formed into a condition free from a variation. The core wire portion is unified, and is stabilized in shape, and therefore the good connection can be obtained in either of the press-contacting operation and the press-fitting operation. More specifically, in either of the press-contacting operation in which the wire is pressed to be inserted between a pair of press-contacting blades to be connected to the terminal and the press-fitting operation in which the wire is press-fitted into a slit to be connected to the terminal, cutting will not develop in the core wire portion, and also the sufficient area of contact can be secured, and as a result the good connection can be obtained.

The method of the present invention is also effective for the case where oxide films are formed on the surfaces of the element wires. Namely, the plurality of element wires are caused to rub against one another by the ultrasonic vibration, and therefore the oxide films are destroyed by this rubbing. When the oxide films are destroyed, the electrical resistance value at the portion which is to be press-contacted or press-fitted can be reduced. Also, when the oxide films are destroyed, an electric current positively flows into the inside of the core wire portion, and the increase of the resistance value can be suppressed.

Incidentally, in the case in which the core wire portion is merely crushed by press-working, it is feared that the element wires thus press-worked may become too thin. Also, it is feared that cutting may develop in the element wires because the element wires become too thin. In the present invention, however, such situations will not occur.

According to the aspect of the present invention, the core wire portion is unified into the desired cross-sectional shape by the shape of a horn for applying ultrasonic vibration, the shape of an anvil for receiving it, the shape of other associated portions and the applied pressure. For example, in the case in which the core wire portion is formed into a rectangular cross-sectional shape, and the connection is effected by the press-contacting, the width of the core wire portion can be easily set in accordance with the slot width which is the gap between the pair of press-contacting blades. Also, the core wire portion can be set to the desired resistance value. This is the same with the case where the connection is effected by the press-fitting. On the other hand, in the case in which the core wire portion is formed into a circular cross-sectional shape, and the connection is effected by the press-contacting or the press-fitting, the directionality can be ignored, and the operation can be carried out efficiently.

In the present invention, there are achieved advantages that the good connection can be effected and that variations relating to the connection can be absorbed. In the present invention, there are also achieved advantages that the width of the core wire portion and the resistance value thereof can be easily set and that the efficiency of the operation can be enhanced.

BRIEF DESCRIPTION OF DRAWINGS

FIG. 2A is the perspective view showing a wire before a sheath is stripped therefrom, and FIG. 2B is the perspective view of the wire from which the sheath has been stripped.

FIG. 3A is the schematic view showing the construction of a welding operation performing portion of an ultrasonic processing apparatus, and FIGS. 3B and 3C are the schematic views showing unified core wire portions, respectively.

FIG. 4A is the schematic view showing a press-contacted condition of the core wire portion of FIG. 3B, and FIG. 4B is the schematic view showing a press-contacted condition of the core wire portion of FIG. 3C.

DESCRIPTION OF EMBODIMENTS

Figure 1:
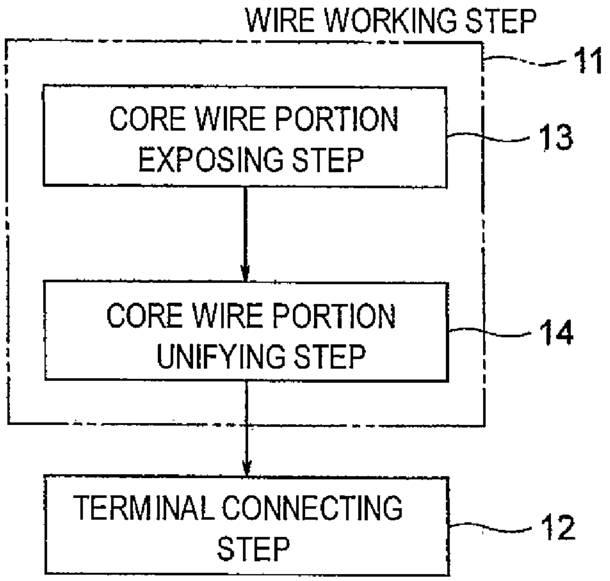
FIG. 1 is a block diagram showing a wire end processing method of the present invention.

One preferred embodiment of the present invention will now be described with reference to the drawings. FIG. 1 is a block diagram showing a wire end processing method of the invention.

The wire end processing method of the invention comprises a step 11 of working a wire to form a connecting portion thereof, and a terminal connecting step 12 of press-contacting or press-fitting a terminal to the connecting portion of the wire. The wire working step 11 includes a core wire portion exposing step 13 of exposing a core wire portion, and a core wire portion unifying step 14 of forming the core wire portion into a solid wire.

Figure 2A:
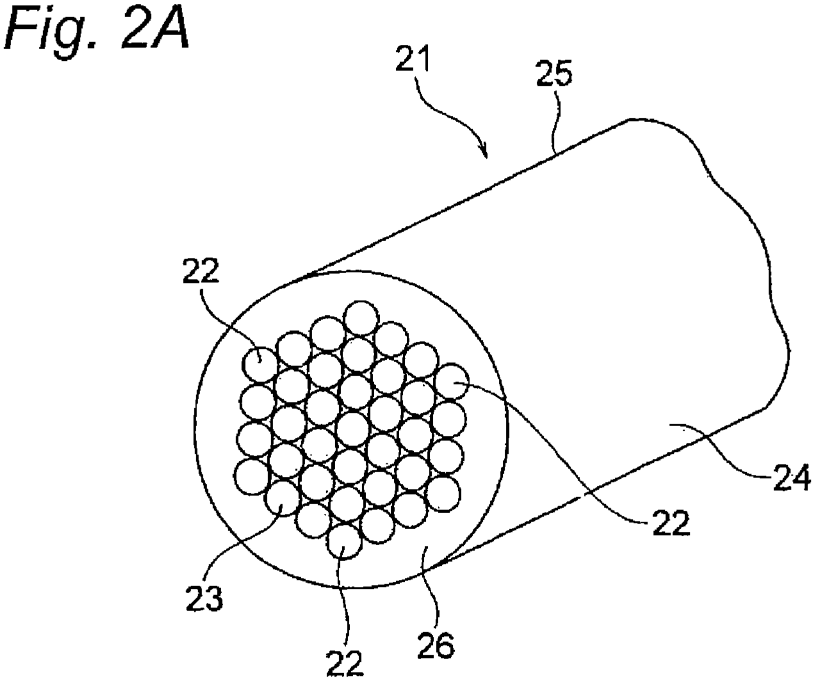
FIGS. 2A and 2B are views showing a core wire portion exposing step.
Figure 2B:
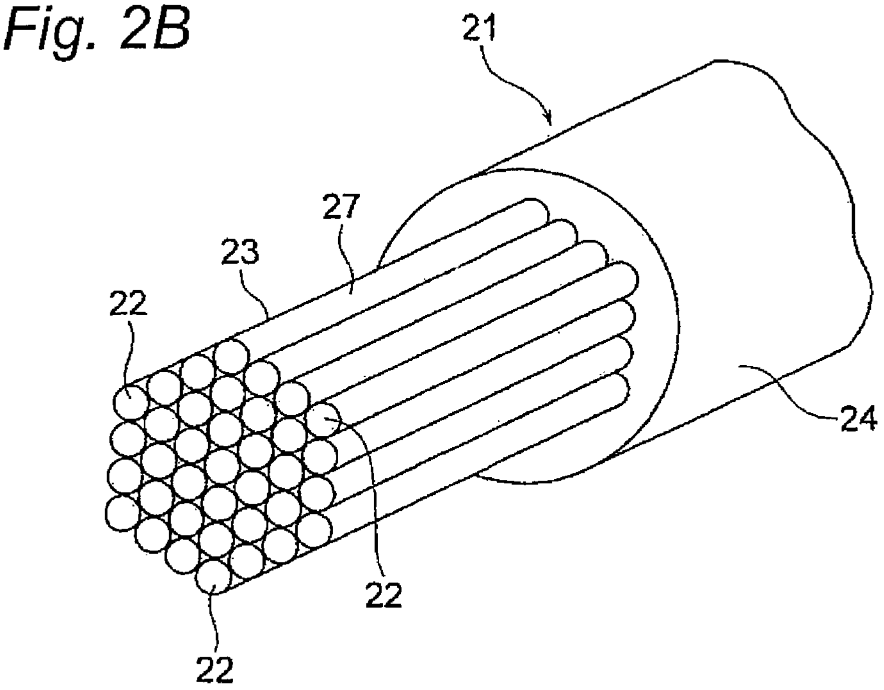
Figure 3A:
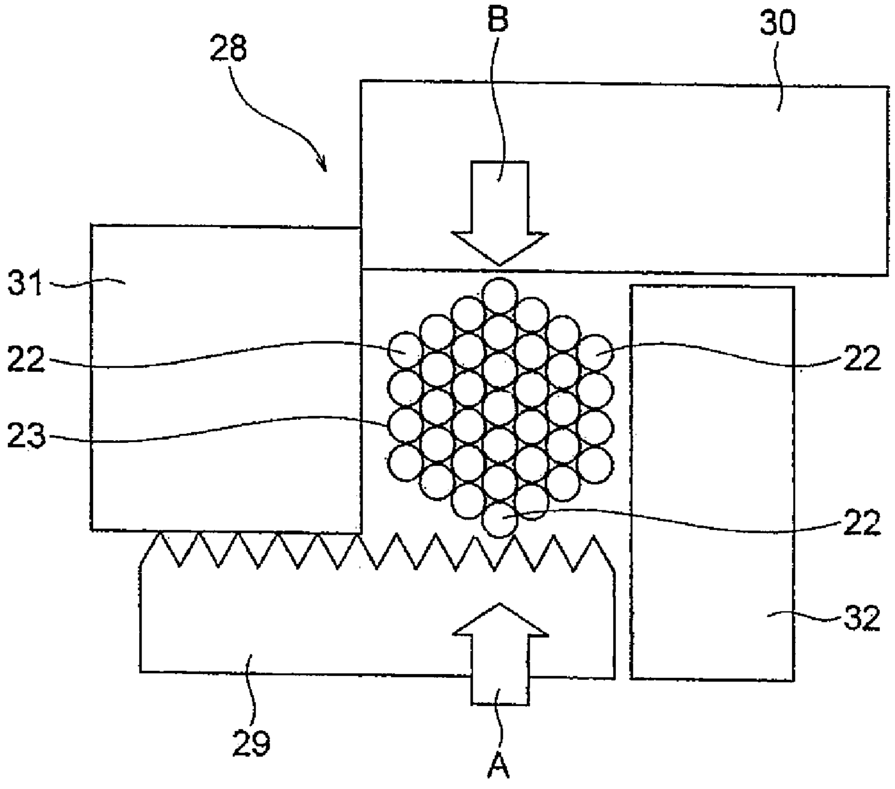
FIGS. 3A to 3C are views showing a core wire portion unifying step.
Figure 3B:
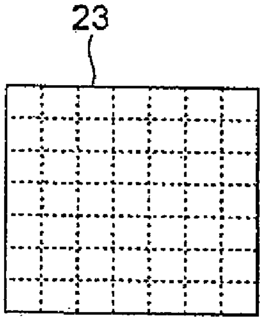
Figure 3C:
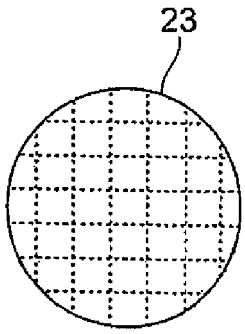
Figure 4A:
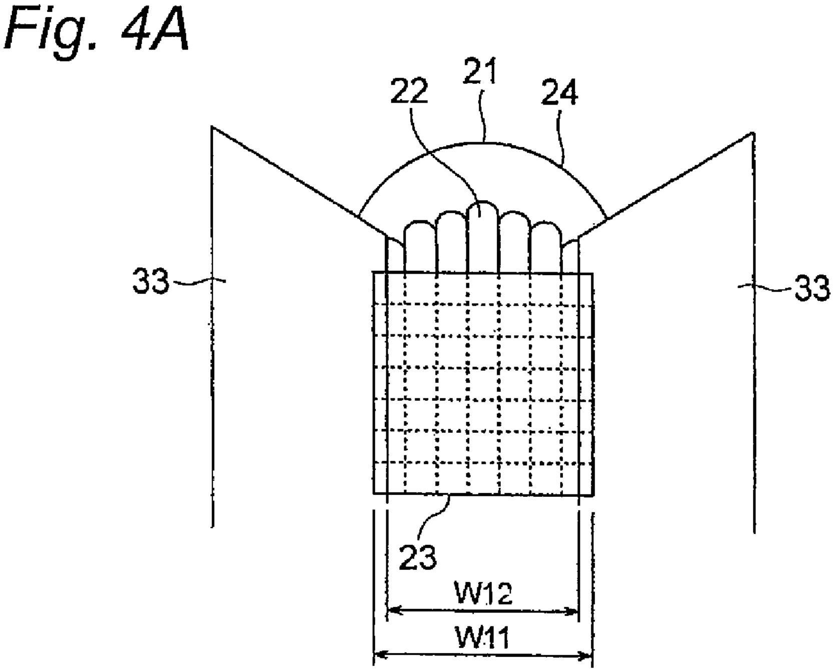
FIGS. 4A and 4B are views showing a terminal connecting step.
Figure 4B:
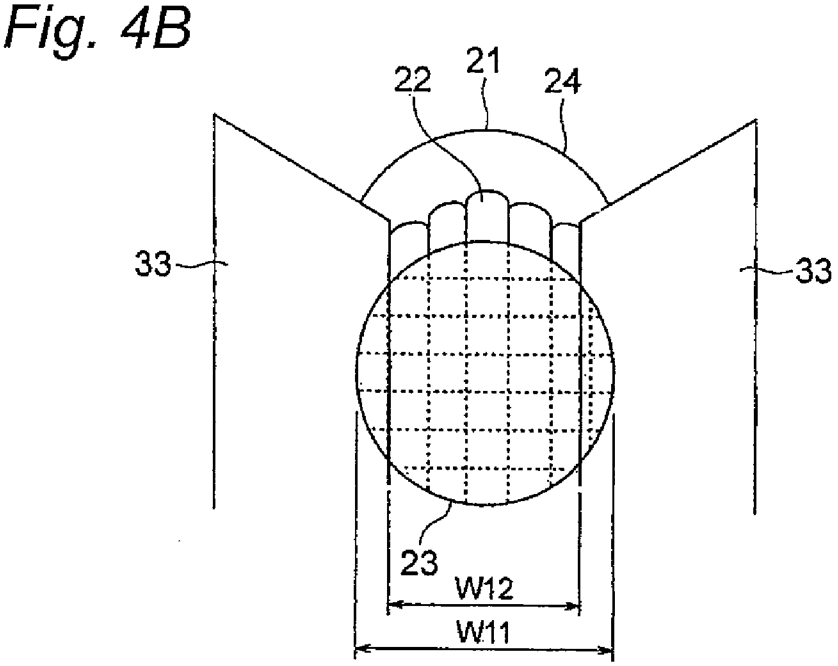
Figure 5:
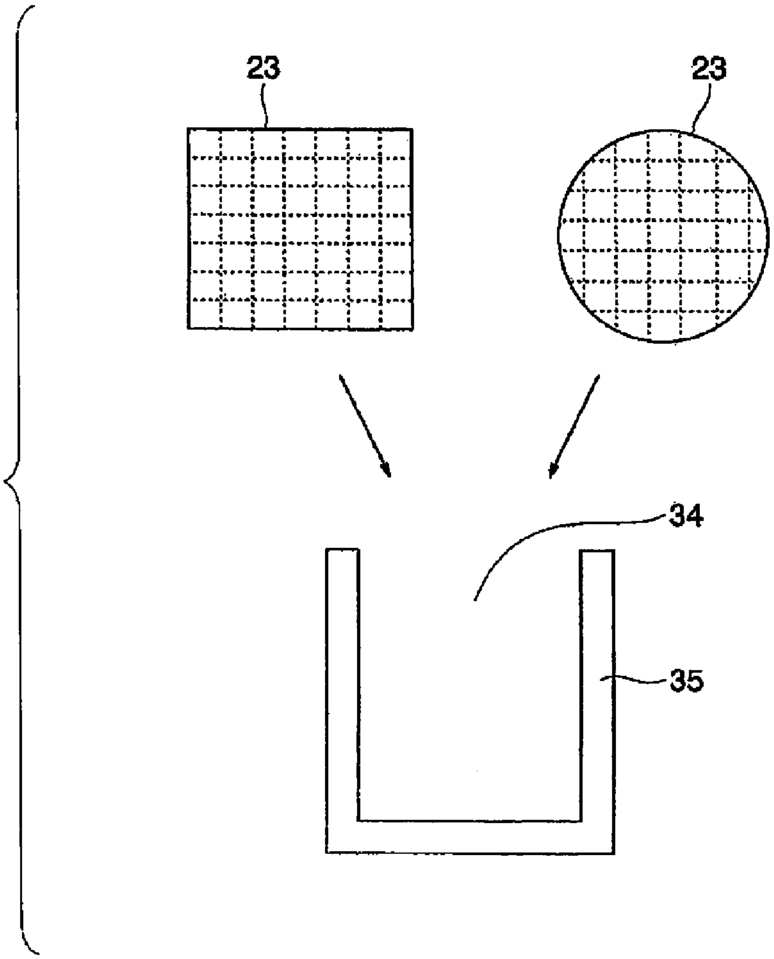
FIG. 5 is a schematic view showing a condition in which each of the core wire portions of FIGS. 3B and 3C is just to be press-fitted.
Figure 6A:
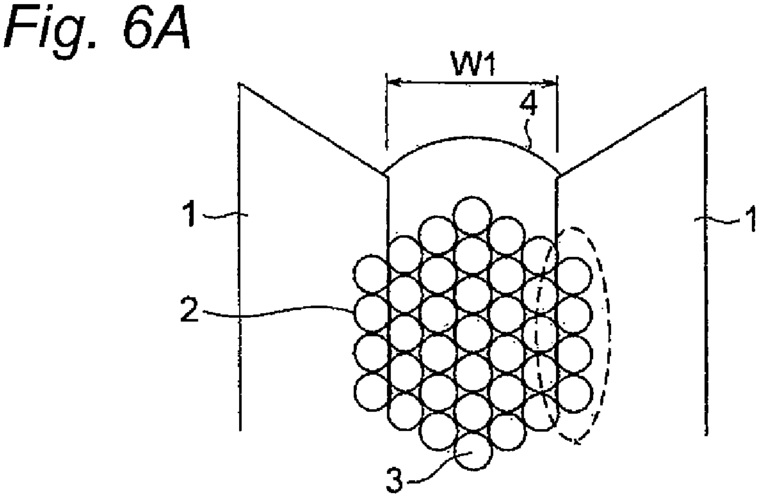
FIGS. 6A to 6C are schematic views showing a conventional wire end processing method.
Figure 6B:
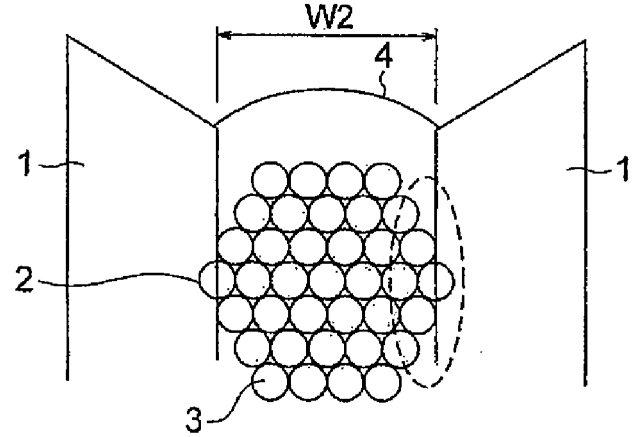
Figure 6C:
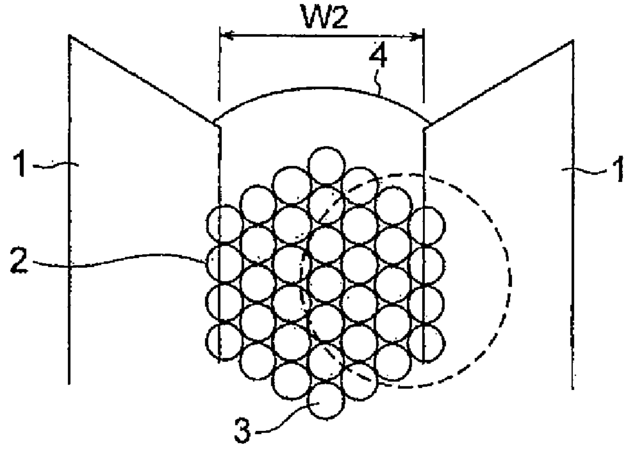

One preferred embodiment will be described below with reference to the drawings. FIGS. 2A and 2B are views showing the core wire portion exposing step of the wire end processing method of the invention. FIGS. 3A to 3C are views showing the core wire portion unifying step, and FIGS. 4A and 4B are views showing the terminal connecting step. FIG. 5 is a schematic view showing a condition in which each of the core wire portions of FIGS. 3B and 3C of 3B is just to be press-fitted.

In FIGS. 2A and 2B, reference numeral 21 denotes the wire. The wire 21 forms a wire harness to be installed, for example, in an automobile, and comprises the core wire portion 23 composed of a plurality of element wires 22, and a sheath 24 entirely covering the outer periphery of the core wire portion 23. In this embodiment, with respect to the wire 21 used in the wire harness for the automobile, the description will be made taking an aluminum wire as an example. The reason why the aluminum wire is taken as an example is that there is a tendency to replace commonly-used copper wires with aluminum wires in recent years in view of a lightweight design and good recyclability. Another reason is that the problem of an oxide film in an aluminum wire can be solved by the present invention. An oxide film develops also in the copper wire although its amount is smaller as compared with the aluminum wire, and therefore the method of the invention is also effective for the copper wire.

The element wires 23 forming the core wire portion 23 are non-plated element wires composed of aluminum or an aluminum alloy, and these element wires are arranged in such a bundled condition that they contact one another as shown in FIG. 2A. In the case of using a copper wire, the element wires are composed of copper or a copper alloy. An electrical conductivity of aluminum is about 60% of that of copper, but aluminum has an advantage that its weight is ⅓ of that of copper. Therefore, aluminum has an advantage that a much more lightweight design can be expected. Further, aluminum is lower in melting point than copper, and therefore has an advantage that it is easy to recover the metal.

In the core wire portion exposing step 13 (see FIG. 1), the sheath 24 is removed from an end portion 25 of the wire 21 by an ordinary method. Namely, the sheath 24 is removed (stripped) from the wire 21 over a predetermined length from an end face 26 of the wire 21. When the sheath 24 is removed over the predetermined length, the core wire portion 23 is exposed as shown in FIG. 2B. Reference numeral 27 denotes an exposed portion of the core wire portion 23. In this embodiment, although the sheath 24 is stripped from the end portion 25 of the wire 21, the sheath may be stripped from an intermediate portion of the wire 21 to which the terminal can be connected.

In FIG. 3A, reference numeral 28 denotes a welding operation performing portion of an ultrasonic processing apparatus. The welding operation performing portion 28 comprises a welding horn 29, an anvil 30, a horn-side plate 31, and an anvil-side plate 32. The welding horn 29 is provided as a portion for applying ultrasonic vibration to the core wire portion 23. A mechanism and a circuit which drive the welding horn 29 are the same as commonly-used mechanism and circuit. The anvil 30 is disposed in opposed relation to the welding horn 29, and serves as a reception portion to receive the core wire portion 23. The horn-side plate 31 and the anvil-side plate 32 are provided as portions for forming the core wire portion 23 into a predetermined shape. The horn-side plate 31 and the anvil-side plate 32 are so mounted as to move toward and away from each other. The showing of a moving mechanism is omitted.

The ultrasonic processing apparatus is so constructed as to apply ultrasonic vibration to the core wire portion 23, using energy, a vibration amplitude, the distance between the horn-side plate 31 and the anvil-side plate 32, a pressure, etc., as factors. The ultrasonic processing apparatus is constructed such that at the welding operation performing portion 28, ultrasonic vibration can be applied to the core wire portion 23 while applying a pressure thereto, so as to cause the plurality of element wires 22 to rub against one another, thereby welding these element wires together. Further, the apparatus is constructed such that at the welding operation performing portion 28, the core wire portion 23 can be formed into a cross-sectional shape corresponding in shape to that portion of the terminal to which the core wire portion 23 is to be press-contacted or press-fitted.

In the core wire portion unifying step 14 (see FIG. 1), the core wire portion 23 is set in an inserted manner at the welding operation performing portion 28, and then when the apparatus is operated, the plurality of element wires 22 forming the core wire portion 23 are caused to rub against one another by ultrasonic vibration. The direction of the ultrasonic vibration is represented by an arrow A, and the direction of the pressure is represented by an arrow B in FIG. 3A. When frictional heat is generated by this rubbing operation, the element wires 22 are melted together, and because of this melting, the plurality of element wires 22 are changed into a solid wire just as in a united condition. Namely, the plurality of small-diameter element wires 22 are changed into the single core wire portion 23 of a larger diameter (or cross-sectional area) as shown in FIG. 3B. Broken lines in this Figure conceptually show the united condition of the element wires 22.

In the present invention, the element wires are melted together to be united together, and therefore are formed into the unified condition as described above. Thus, this is not the case where the surfaces of the element wires 22 are roughened by rubbing, and the roughened portions are engaged with one another, so that the element wires are joined together. In the present invention, the joining is such that the element wires 22 will not be separated from one anther upon application of an external force.

When the plurality of element wires 22 are caused to rub against one anther by the ultrasonic vibration, oxide films (not shown) formed on the surfaces of the element wires 22 are destroyed by the rubbing. When the oxide films are destroyed, the factor in the instability of the resistance value is overcome.

In this embodiment, the cross-sectional shape of the unified core wire portion 23 is formed into a rectangular shape determined by the construction of the welding operation performing construction 28. As shown in FIG. 3C, the cross-sectional shape may be formed into a circular shape. It will be appreciated that the unified core wire portion 23 is formed into the stable shape free from a variation.

In FIG. 4A, reference numeral 33 denotes a pair of press-contacting blades of the press-contacting terminal. Each pair of press-contacting blades 33 are provided at a respective one of about two or three portions of the terminal spaced from each other in a longitudinal direction of the terminal although the press-contacting blades are not particularly limited to this arrangement. The press-contacting terminal is formed by press-working a metal sheet of an electrically-conductive nature. The material of which the press-contacting terminal is made is preferably copper or a copper alloy, and may be Sn-plated copper or copper alloy. The unified core wire portion 23 (having the shape shown in FIG. 3B) is formed such that its width W11 is larger than a slit width W12 which is a gap between the pair of press-contacting blades 33. The size is set at the ultrasonic processing apparatus, and this setting is easy in the present invention in which the shape is made stable.

In the terminal connecting step (see FIG. 1), when the unified core wire portion 23 is pressed to be inserted between the pair of press-contacting blades 33, the press-contacting blades 33 contact opposite side portions of the core wire portion 23, respectively, in biting relation thereto, and thus the connection between the wire 21 and the press-contacting terminal is completed. FIG. 4B shows a condition in which the unified core wire portion 23 having the shape shown in FIG. 3C is pressed to be inserted between the pair of press-contacting blades 33. The press-contacting blades 33 contact arc-shaped opposite side portions of the core wire portion 23, respectively, in biting relation thereto, and thus the connection between the wire 21 and the press-contacting terminal is completed. In the case of the unified core wire portion 23 having the shape shown in FIG. 3C, the direction of pressing (inserting) of this core wire portion is of no importance as compared with the unified core wire portion having the shape shown in FIG. 3B. There is an advantage that the efficiency of the operation is good. When the connection between the wire 21 and the press-contacting terminal is completed, the series of steps is also completed.

With respect to the terminal connecting step 12 (see FIG. 1), the core wire portion can be applied to a press-fitting portion 35, which is a part of a terminal, having a slit 34 as shown in FIG. 5. When the unified core wire portion 23 is pressed into the slit 34, so that the press-fitting portion 35 and the core wire portion 34 are contacted with each other, the connection is completed.

As described above with reference to FIGS. 1 to 5, in the present invention, in either of the press-contacting operation in which the wire is pressed to be inserted between the pair of press-contacting blades 33 to be connected thereto and the press-fitting operation in which the wire is press-fitted into the slit 34 to be connected to the press-fitting portion 35, cutting will not develop in the core wire portion 23, and also the sufficient area of contact can be secured, and as a result there is achieved an advantage that the good connection can be obtained.

Furthermore, in the present invention, there is achieved an advantage that the shape of the core wire portion 23 can made stable, thereby achieving the connection free from a variation.

Furthermore, in the present invention, there is achieved an advantage that the enhancement of the electrical conductivity and the stabilization of the resistance value can be achieved by the effect of destroying and removing the oxide films. There is achieved an advantage that the resistance value of those portions which do not contact the press-contacting blades 33 or the press-fitting portion 35 can be stabilized.

Although the present invention has been illustrated and described for the particular preferred embodiments, it is apparent to a person skilled in the art that various changes and modifications can be made on the basis of the teachings of the present invention. It is apparent that such changes and modifications are within the spirit, scope, and intention of the invention as defined by the appended claims.

The present application is based on Japanese Patent Application No. 2010-008045 filed on Jan. 18, 2010, the contents of which are incorporated herein by way of reference.

INDUSTRIAL APPLICABILITY

The present invention is extremely useful to effect the good connection and to absorb variations relating to the connection in the connection between the wire and the terminal. Further, the present invention is extremely useful to easily set the width of the core wire portion and the resistance value thereof and enhance the efficiency of the operation of the connection between the wire and the terminal.

REFERENCE SIGNS LIST

21 wire
22 element wire
23 core wire portion
24 sheath
25 end portion
26 end face
27 exposed portion
28 welding operation performing portion
29 welding horn
30 anvil
31 horn-side plate
32 anvil-side plate
33 press-contacting blade
34 slit
35 press-fitting portion

The invention claimed is:

1. A wire end processing method, comprising:

a core wire portion exposing step of stripping a sheath of a wire so as to expose a core wire portion composed of a plurality of element wires;

a core wire portion unifying step of applying ultrasonic vibration to the exposed core wire portion while applying a pressure thereto, thereby causing the plurality of the element wires to rub against one another so as to unify the core wire portion, so that the core wire portion is formed into a cross-sectional shape corresponding to a shape of a portion of a terminal where the core wire portion is to be press-contacted or press-fitted; and a terminal connecting step of press-contacting or press-fitting the unified core wire portion to the terminal, wherein the unified core wire portion has a cross-sectional width that is larger than the portion of the terminal where the unified core wire portion is press-contacted or press-fitted and the terminal comprises a first blade and a second blade, and the portion of the terminal in which the unified core is press-contacted or press-fitted comprises a gap between the first blade and the second blade.

2. The wire end processing according to claim 1, wherein the plurality of element wires comprise non-plated element wires.

3. The wire end processing according to claim 1, wherein the core wire portion unifying step melts the plurality of element wires.

* * * * *